United States Patent
Martinez

(12) 
(10) Patent No.: US 11,242,269 B2
(45) Date of Patent: Feb. 8, 2022

(54) SYSTEM FOR RECYCLING WASTEWATER FROM REVERSE OSMOSIS FILTERING PROCESSES AND METHOD FOR TREATING WASTEWATER

(71) Applicant: ALLFLOW EQUIPAMENTOS INDUSTRIAIS E COMERCIO LTDA., Sao Paulo (BR)

(72) Inventor: Lucas Martinez, Jundiai (BR)

(73) Assignee: ALLFLOW EQUIPAMENTOS INDUSTRIAIS E COMERCIO LTDA., Sao Paulo (BR)

( * ) Notice: Subject to any disclaimer, the term of this patent is extended or adjusted under 35 U.S.C. 154(b) by 83 days.

(21) Appl. No.: 16/641,368

(22) PCT Filed: Aug. 22, 2018

(86) PCT No.: PCT/BR2018/050300
§ 371 (c)(1),
(2) Date: Jun. 3, 2020

(87) PCT Pub. No.: WO2019/036787
PCT Pub. Date: Feb. 28, 2019

(65) Prior Publication Data
US 2020/0299158 A1    Sep. 24, 2020

(30) Foreign Application Priority Data

Aug. 22, 2017 (BR) .................. 10 2017 017957 5
Aug. 21, 2018 (BR) .................. 10 2018 017138 0

(51) Int. Cl.
*B01D 61/10*    (2006.01)
*C02F 1/44*    (2006.01)
(Continued)

(52) U.S. Cl.
CPC ............. *C02F 1/66* (2013.01); *B01D 61/10* (2013.01); *C02F 1/008* (2013.01); *C02F 1/441* (2013.01);
(Continued)

(58) Field of Classification Search
CPC .. C02F 1/66; C02F 1/441; C02F 1/008; C02F 2301/046; C02F 2209/06; C02F 2209/05;
(Continued)

(56) References Cited

U.S. PATENT DOCUMENTS 5,846,418 A    12/1998    Thompson et al.
6,537,456 B2 *    3/2003    Mukhopadhyay ... B01D 61/022
                                                            210/638
(Continued)

FOREIGN PATENT DOCUMENTS

BR    PI9500182-4 A    1/1997
BR    PI9611909-8 A    10/2001
(Continued)

*Primary Examiner* — Joseph W Drodge
(74) *Attorney, Agent, or Firm* — The Webb Law Firm

(57) ABSTRACT

A system and a method for reusing waste water from a Reverse Osmosis (RO) filtering process are described, said system including: a Reverse Osmosis (RO) filtration system, from which a flow of highly alkaline waste water results; two tanks intended to receive waste water and able to alternately determine the physical and chemical properties of waste water through sensors or, and perform homogenization, chlorination and chemical treatments of said waste water; an output line which comprises a pump and connects the tanks to a reservoir; and said reservoir being able to blend the water treated by the tanks with treated chlorinated (Continued)

drinking water, depending on the physical and chemical properties of these volumes of water; the chlorination and chemical treatment includes addition of a hypochlorite compound, which reaction releases chlorine in the waste water and causes evaporation of at least $O_2$ and $H_2$ gases, reducing the alkaline pH of said waste water.

11 Claims, 2 Drawing Sheets

(51) Int. Cl.
  *C02F 1/66* (2006.01)
  *C02F 1/00* (2006.01)
(52) U.S. Cl.
  CPC ...... *B01D 2311/08* (2013.01); *C02F 2209/02* (2013.01); *C02F 2209/05* (2013.01); *C02F 2209/06* (2013.01); *C02F 2301/046* (2013.01)
(58) Field of Classification Search
  CPC .. C02F 2209/02; C02F 2103/343; C02F 1/76; C02F 1/44; C02F 1/763; B01D 2311/24; B01D 2311/12; B01D 2311/243; B01D 61/04; B01D 61/12; B01D 61/025; B01D 2311/06; B01D 2311/08; B01D 2311/263; B01D 2311/2634; B01D 61/10; B01F 5/10
  See application file for complete search history.

(56) References Cited

U.S. PATENT DOCUMENTS

| | | |
|---|---|---|
| 9,199,866 B2 | 12/2015 | Al-Samadi |
| 9,266,762 B2 | 2/2016 | Wang et al. |
| 2005/0103717 A1* | 5/2005 | Jha .............. C02F 5/00 210/652 |
| 2005/0145570 A1* | 7/2005 | Pipes ............ B01D 61/58 210/652 |
| 2012/0168378 A1* | 7/2012 | Taniguchi ........ B01D 61/06 210/650 |
| 2012/0305459 A1* | 12/2012 | Takabatake ...... B01D 61/022 210/97 |
| 2013/0032532 A1* | 2/2013 | Arai .............. C02F 3/02 210/615 |
| 2016/0289099 A1* | 10/2016 | Wallace .......... C02F 1/4693 |
| 2017/0121202 A1* | 5/2017 | Sekine ........... C02F 1/444 |
| 2017/0217790 A1* | 8/2017 | Lengerich ....... C02F 1/5236 |
| 2018/0057376 A1* | 3/2018 | Chen ............. B01D 61/022 |
| 2018/0265373 A1* | 9/2018 | Chen ............. C02F 9/00 |

FOREIGN PATENT DOCUMENTS

| | | |
|---|---|---|
| BR | 102015026107-1 A2 | 5/2017 |
| CN | 101723485 A | 6/2010 |
| CN | 102040312 A | 5/2011 |
| CN | 105152414 A | 12/2015 |
| CN | 106369157 A | 2/2017 |
| JP | 2001300547 A | 10/2001 |
| JP | 2001321778 A | 11/2001 |
| KR | 1020130132020 A | 12/2013 |
| WO | 2006009185 A1 | 1/2006 |

* cited by examiner though the large number of technologies known for treatment of waste water, an extremely high percentage of these technologies are aimed at solving particular problems.

SYSTEM FOR RECYCLING WASTEWATER FROM REVERSE OSMOSIS FILTERING PROCESSES AND METHOD FOR TREATING WASTEWATER

This application is the United States national phase of International Application No. PCT/BR2018/050300 filed Aug. 22, 2018, and claims priority to Brazilian Patent Application Nos. 10 2017 017957 5 filed Aug. 22, 2017, and 10 2018 017138 0 filed Aug. 21, 2018, the disclosures of which are hereby incorporated by reference in their entirety.

The present invention relates to a system for reusing waste water from a reverse osmosis filtering process, as well as a method for treatment of waste water. More particularly, the object of the present invention is a semi-continuous chained and automatic system of treatment for discharged effluents from reverse osmosis filtering processes, which has a high rate of reuse.

BACKGROUND OF THE INVENTION

In certain sectors of the modern industry, such as in the food industry and mainly in the pharmaceutical industry, the addition of water in products must follow absolutely restrictive standards in order to avoid harm to consumers. Thus, the water supplied by supply companies must be subjected to preliminary treatments before being used in industrial production processes. One of these treatments already established in the art is carried out through the so-called reverse osmosis, that is, a filtering treatment in which the liquid being filtered is forced, through a membrane, from a region of higher concentration into a region of lower concentration. As a result, the concentration of particles and ions in the region of higher concentration increases while the "filtered" liquid is being removed from the region of low concentration.

At the end of this process, a given filtered volume is directed to the desired production processes, while the remaining volume in the region of high concentration is discarded due to the resulting high ionic concentration and high basic pH.

In the specific case of a pharmaceutical industry, some definitions concerning to the types of water involved in the production of drugs are:

A) Treated Chlorinated Drinking Water

It is the water supplied by concessionaires of water supply (Mains Water System, etc.) having quality standards set and regulated by public agencies.

Such "Treated Chlorinated Drinking Water" finds general use in several sectors of a pharmaceutical plant and it is defined as "water having a minimum of quality" for use in drug manufacturing processes; it is intended, for example, for washing some equipment and the like.

B) Purified Water (PW)

It is water obtained within the manufacturing units of pharmaceutical industries as the main product, through a process of reverse osmosis, in equipment installed inside the plants. The quality standards of this water for use in drug manufacturing industries are set and regulated by official regulatory agencies.

Such purified water is used in several stages of drug manufacturing processes in a pharmaceutical plant, and it can be used as an ingredient, etc. and even as a sanitizing agent for processing equipment.

Water for Injection (WFI)

As in the previous case, it is water obtained within the manufacturing units of pharmaceutical industries as the main product through a reverse osmosis process, in equipment installed inside the plants. The water quality standards for use in drug manufacturing industries are set and regulated by official regulatory agencies.

Similarly, such water is used in various stages of drug manufacturing processes in a pharmaceutical plant, and it can be used as an ingredient, etc. and even as a sanitizing agent for processing equipment.

Waste Water

It is water obtained inside the manufacturing units of pharmaceutical industries as a by-product of a reverse osmosis process, in equipment installed inside the plants. Such water does not have fixed or constant quality standards, and quality control is carried out by measuring the quality of the water in laboratories of drug manufacturing industries.

As a characteristic, such waste water has high pH value and electrical conductivity, due to a high concentration of saline ions in solution, which are removed from the treated chlorinated drinking water (supplied by the concessionaire of water supply) that feeds the equipment of osmosis by filtration via semi-permeable membranes. These physical and chemical standards make it impossible the direct reuse of such water at any stage of the pharmaceutical manufacturing process, and it is not qualified as suitable for human consumption. It is used only as water for washing external areas of the plant, irrigation and flushing of toilets, being stored and directed for consumption in dedicated and isolated hydraulic circuits inside the plant.

The flow of waste water generated corresponds to up to 45% of the flow of treated chlorinated drinking water that enters the reverse osmosis equipment for generation of PW water.

Considering what was described above, the result is a scenario of underutilization of significant volumes of waste water generated, destined for less noble applications.

Furthermore, several methods are known in the art for reuse of waste water generated as by-product in Reverse Osmosis (RO) filtering processes. Despite the large number of technologies known for treatment of waste water, an extremely high percentage of these technologies are aimed at solving particular problems.

Among the generic solutions, the document CN 106369157 describes a method comprising several steps of treatment of waste water in an RO purification process. In this case, the disposal (waste) of RO is subjected, under pressure, to a series of advancing and returning branches of waste water.

The documents U.S. Pat. No. 9,199,866 or BR 102015026107-1 combine RO or nanofiltration with ion exchange resins in water treatment for production of drinking water. The document KR 20130132020 describes a double filtering system, in successive tanks, to increase performance in water purification systems. On the other hand, the document U.S. Pat. No. 9,266,762 teaches a pre-treatment of water using $CO_2$ before the filtration step, with removal of a supernatant and its reintroduction in the pre-treatment step. The document PI 9500182-4 combines micro-ozonation processes with RO for production of drinking water from industrial effluents.

In addition, the art also teaches several methods and systems of water treatment, aiming to transform them in drinking water. In these methods, sodium or calcium hypochlorite is often used as a bactericidal and microbial agent. For example, the document PI 9611909-8 describes a water treatment from filtration and dispersion of a microbial agent, such as calcium hypochlorite.

Anyway, and in various citations of the art in relation to the use of hypochlorite, in water recovery processes this ion is always used as a microbial or bactericide agent, since it is an effective and low cost product for such purpose.

OBJECTS OF THE INVENTION

A first object of the present invention is a system and method capable of allowing the reuse of waste water from a reverse osmosis filtration process.

A second object of the present invention is a system and method with low cost of implementation and high yield for treatment of waste water from reverse osmosis filtration.

SUMMARY OF THE INVENTION

The present invention relates to a system for reusing waste water from a reverse osmosis filtering process of treated chlorinated water, comprising: a reverse osmosis filtering system, which results in a flow of purified water (PW, WFI) and a flow of highly alkaline waste water; two tanks intended to receive pre-selected waste water from the RO filtration system, such tanks able to alternately determine the physical and chemical properties of the waste water through sensors, and perform homogenization, chlorination and chemical treatments of said waste water; an output line comprising a pump and connecting the tanks to a reservoir, said reservoir being able to blend the water treated by the tanks with treated chlorinated drinking water, depending on the physical chemical properties of these volumes of water. Chlorination and chemical treatment are carried out in any one of the tanks, and include addition of a hypochlorite compound, the reaction of which releases chlorine in the waste water and causes evaporation of at least $O_2$ and $H_2$ gases, reducing the alkaline pH of such waste water.

In preferred embodiments of the invention, each tank comprises a system of homogenization by recirculation, said recirculation comprising a line provided with a pump connecting the bottom to the top of the tank. The temperature, pH and/or electrical conductivity sensors are arranged in said recirculation line. The chlorination and chemical treatment of waste water are carried out with sodium hypochlorite, wherein said sodium hypochlorite is added to said recirculation line.

Any one of the tanks alternatively comprises a mechanical stirring homogenization system, and said temperature, pH and/or electrical conductivity sensors are arranged inside the tank, with said sodium hypochlorite being added directly into the tank.

Finally, the blending carried out in the reservoir comprises addition of an quantity of up to 45% by volume of pre-treated water, in relation to total volume of pre-treated and slightly alkaline blended water from the tank, to an quantity of at least 55% by volume of slightly acidic, treated chlorinated drinking water.

The present invention further comprises a method for treatment of waste water originating from reverse osmosis filtration treatments, comprising the steps of: receiving waste water from RO in a pre-treatment tank; adding a hypochlorite compound; homogenizing the water in pre-treatment; measuring the pH of the water in pre-treatment, wherein: if the pH of the water is not within a pre-established limit, return to the step of addition of a hypochlorite compound; and if the pH of the water is within a pre-established limit, sending the pre-treated water to a blending reservoir and mix a quantity of up to 45% in volume of pre-treated water with an quantity of at least 55% in volume of treated chlorinated drinking water.

More particularly, the step of receiving waste water from RO comprises discarding the waste water having a pH greater than 13. The step of adding a hypochlorite compound comprises adding a hypochlorite salt, which is sodium hypochlorite. The step of homogenizing the water comprises recirculating water in the tank, or stirring the water in the tank.

The step of measuring the pH of the water includes employing a pH sensor to directly measure the pH; employing an electrical conductivity sensor to measure a quantity of conductivity proportional to the pH of the water; and/or employing a temperature sensor to thermally adjust the pH value or the electrical conductivity of the water. In addition, and in the same step of measuring the pH of the water, the pre-established limit of pH is between 8.2 and 9.5, and is preferably equal to 9. Alternatively, the pre-established limit of a quantity of conductivity proportional to the pH of the water corresponds to an electrical conductivity of 500 micro-Siemens.

In other words, the system and method of the present invention encompass a pre-treatment step of waste water produced in the industry and generated as a waste by-product, in reverse osmosis equipment for generation of PW water and WFI water, through automatic control via dedicated supervisory routine, which manages the data obtained by process instrumentation installed in the storage and treatment systems of such water, and a step of blending such chlorinated reuse water with treated chlorinated drinking water, wherein this mixed water is stored in the main reservoir of the plant, such mixed water already appearing as a final chlorinated treated water, according to the standards of the federal regulatory law, for later use as raw material in PW and WFI production systems and application in other industrial uses of treated chlorinated drinking water.

More particularly, the present invention relates to a system for reusing waste water from a reverse osmosis filtering process, comprising: a bipartite main reservoir for receiving treated chlorinated drinking water and distributing it to the industry; a reverse osmosis filtration system, said filtration system being fed by the main reservoir, resulting in a flow of purified water (PW, WFI) and a flow of waste water; two intermediate reservoirs intended to receive, through piping, the waste water from the filtration system after the pre-selection of said waste water, said reservoirs being able to alternately analyze the physical and chemical properties of the waste water, and perform chlorination (addition of sodium hypochlorite solution) and chemical treatments of the pre-selected waste water; and an output pipe which connects via centrifugal pump the intermediate reservoirs to the upper space (compartment) of the main reservoir of water of the industry; such bipartite main reservoir is able to blend the water treated by the intermediate reservoirs with the treated chlorinated drinking water, previously stored in previously established proportions (between about 55% and 60% of treated chlorinated drinking water), depending on the physical and chemical characteristics of such stored water volumes.

Furthermore, the present invention also refers to a method of treatment of waste water originating from reverse osmosis filtration treatments, comprising the steps of: pre-selection of the reuse water from reverse osmosis as a function of pH concentration and electrical conductivity; chlorination and chemical treatment of the pre-selected water; and blending of the chemically treated water, in a controlled manner, with the treated chlorinated drinking water received before the reverse osmosis process.

BRIEF DESCRIPTION OF THE DRAWINGS

The present invention will be better understood from the detailed description of a preferential and non-limiting embodiment of the invention, which is based on the attached figures and is illustrative and not limitative, wherein.

PREFERRED EMBODIMENT OF THE INVENTION

Figure 1:
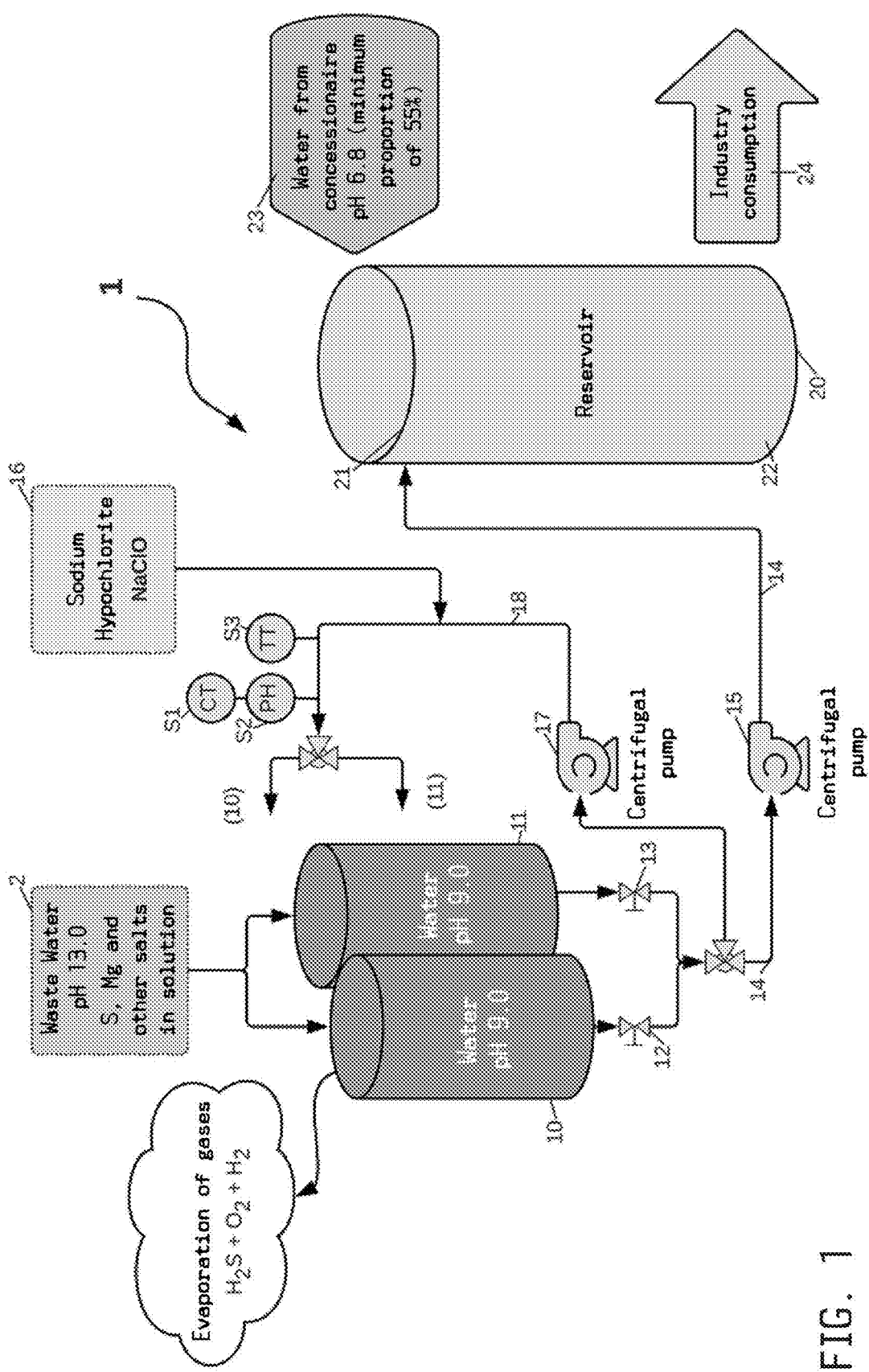
FIG. 1 is a schematic drawing of a plant for implementing the system of the present invention.

In accordance with FIG. 1, (1) indicates generally a plant for treatment of waste water (2) from a Reverse Osmosis (RO) treatment system (not shown).

Numerals (10, 11) indicate two tanks for receiving waste water (2) coming from the RO system, said tanks (10, 11) being chained and each one comprising: one water recirculation system, via line (18) comprising a centrifugal pump (17) for homogenization and chlorination by addition of hypochlorite solution (16), and comprising a pH sensor (S1) and/or an electrical conductivity sensor (S2) and/or a temperature sensor (S3). Alternatively, instead of using a recirculation system (18, 17), each of the tanks (10, 11) is equipped with a stirring system (not shown), such as a mechanical stirrer or a similar device, as well as a respective doser for sodium hypochlorite (16).

Furthermore, said tanks (10, 11) are opened to the atmosphere, in order to allow evaporation of volatiles, as will be described below.

At the bottom of each of the tanks (10, 11) an output port for the stored volume is provided, intermediated by respective valves (12, 13) which, when opened, allow the flow of water contained in one of the tanks (10, 11), via line (14) and pump (15), to the reservoir (20). In addition, both tanks (10, 11) further comprise a drain (not shown) intended for disposal of waste water when it do not reach the minimum standards of treatment, as will be explained later.

Finally, the reservoir (20) is a reservoir having a capacity greater than at least twice the capacity of any of the tanks (10, 11). In addition, the reservoir (20) comprises mixing means intended to promote homogenization of the waters contained therein, as will be explained later. Among such mixing means, mechanical stirrers, branches equipped with pumps and connecting the top to the bottom of the tank, or any other appropriate means, can be selected.

Furthermore, at the top (21) of said reservoir (20) there is also provision for a first input port to receive the flow from the tanks (10, 11), via line (14), and also a second input port to receive a flow of treated chlorinated drinking water (23). In addition, the bottom (22) of the reservoir (20) also has an output port (24) through which the treated water is removed, according to the method of the present invention.

In operation, the system of the invention provides that the flow of waste water (2), originating from a Reverse Osmosis (RO) filtering system, is continuously deposited in a first tank (10), until a certain operating volume of water is reached. At that moment, the flow of waste water (2) is diverted to the second tank (11), which begins to be filled while the treatment is carried out in the volume of water contained in the first tank (10). This chained tanks mechanism allows the treatment of the invention to be carried out in one tank, while the other tank is gradually filled, and vice versa.

Usually, said waste water received has a pH of about 13 and several dissolved elements, such as S, Mg, Cl, F and others.

Thus, in said first tank (10) the pH of waste water (2) is measured, either directly by a pH sensor (S1), or indirectly by an electrical conductivity sensor (S2). Preferably, the pH or electrical conductivity measurements are thermo-adjusted from the waste water (2) temperature indication, measured by the temperature sensor (S3), in order to increase the accuracy of the measured pH value of the waste water contained in the tank (10).

Once determined the pH of the waste water (2), the quantity of hypochlorite compound needed to promote pH reduction of the water to a value between 8.2 and 9.5, and preferably approximately 9, is calculated. In particular, and in the event that the waste water (2) has a pH value greater than about 13, or an electrical conductivity value greater than 500 micro-Siemens, such waste water is discarded through the respective drain. In these particular conditions, it is decided to discard it since the quantity of sodium hypochlorite would be too much high, which would compromise the economic benefits of the present process.

This controlled and selective addition of a hypochlorite compound, preferably a hypochlorite salt and more preferably sodium hypochlorite (NaClO), as discovered by the inventors, leads to several chemical reactions, which have the purpose of neutralizing the pH of waste water, since the ionic species ($OH^-$) react with the hypochlorite anion and form $H_2$ and $O_2$, which simply evaporate, since the tanks (10, 11), as mentioned, are open to the atmosphere.

In addition to the evaporation of these chemical species, there is also the evaporation of some other species, such as $H_2S$. As a whole, as the inventors discovered, their evaporation leads to a reduction in the pH of the water under treatment, which, as mentioned, reaches a pH value usually between 8.2 and 9.5. In addition, some minerals still remain in solution, such as chlorine and fluorine.

As is evident to any technician skilled in the art, for a perfect dissolution of NaClO in water within a predetermined period of time, it is preferable to promote a forced mixing action, for example using mechanical stirrers, recirculators (18, 17) and the like.

Thus, and once a pH value (S1) of the solution is detected within the desired parameters, or even an electrical conductivity value (S2) is detected within the desired parameters, the tank is emptied via line (14) by action of the centrifugal pump (15) and its content is sent to the blending reservoir (20).

Within said reservoir, a calculated quantity of treated chlorinated drinking water (24) is added to the volume of solution received from the tank (10), such treated chlorinated drinking water being supplied by the concessionaire of water supply. According to legal standards, such treated water has a pH between 6.5 and 7, that is, slightly acidic. Thus, adding an quantity corresponding to at least 55% in volume of treated water in relation to the total volume contained in the reservoir (20), and carrying out homogenization (by mechanical agitation, recirculation, or the like), chlorinated reuse water is obtained, within the parameters that allow it to be classified as drinking water. In this way, such recycled drinking water can be sent back to the RO filtering system, in order to be used later as PW or WFI, or else consumed.

Figure 2:
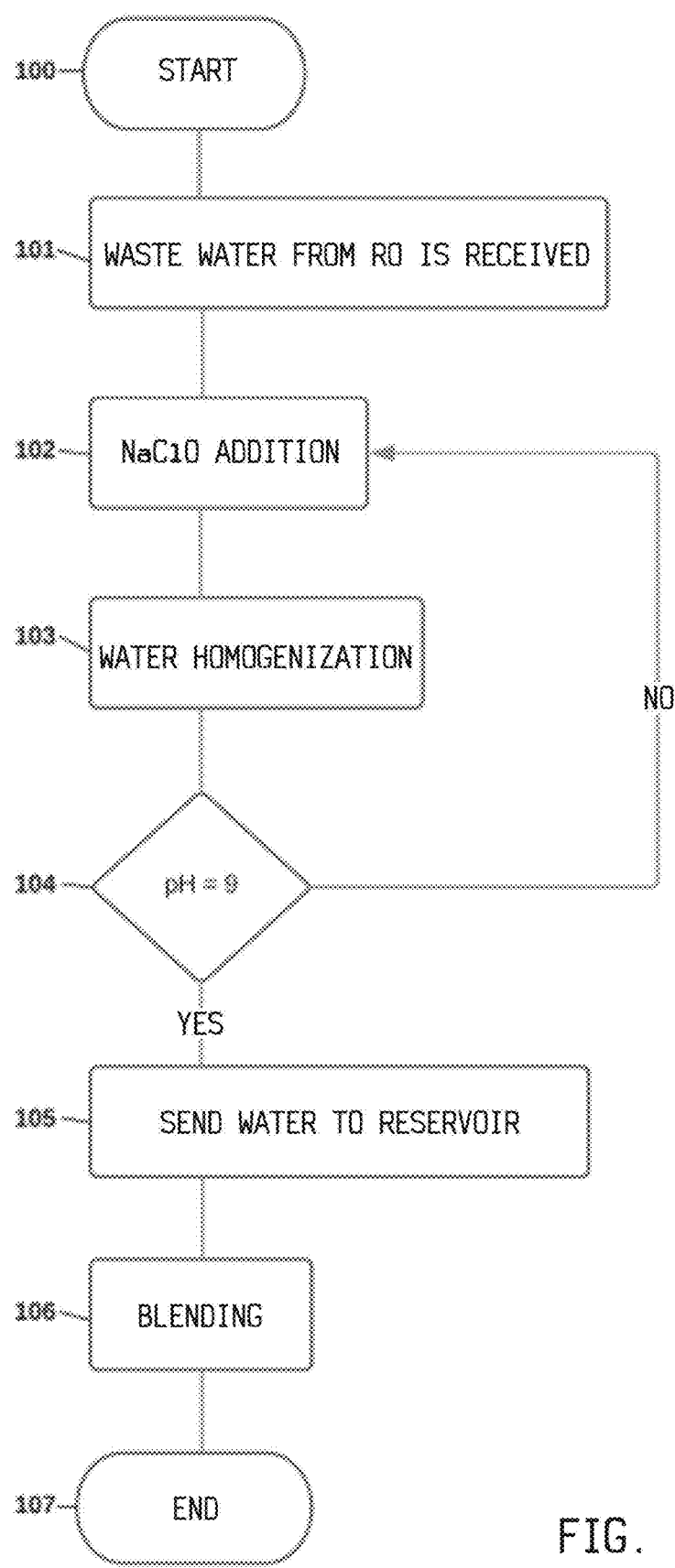
FIG. 2 is a flow diagram relating to the method of the invention.

FIG. 2 illustrates schematically, as a flow diagram, the steps of the method of the invention. In particular, the method starts (S100) and receives (S101) in a tank (10, 11) the volume of waste water that is discarded from a RO filtration system, microfiltration, or similar fine filtration systems.

Then occurs addition (S102) of hypochlorite compound, preferably sodium hypochlorite, in order to reduce the pH of the water by evaporation of $H_2$ and $O_2$ gases resulting from reactions between the hypochlorite and the chemical species in solution in the waste water. Then begins homogenization (S103) of the waste water by recirculation or, alternatively, using agitators. During recirculation, the sensors (S1/S2; S3) evaluate the pH (S104) of the waste water as a function of its temperature, until a pH of up to about 9 is reached. As mentioned, the pH can be directly calculated using the pH sensor (S1), or indirectly calculated through the electrical conductivity sensor (S2). It should be noted that the steps of addition of NaClO (S102), homogenization (S103) and pH measurement (S104) are more efficient when performed continuously, that is, with the waste water being recirculated, wherein NaClO is continuously added until the sensors (S1/S2; S3) determine substantially continuously a pH of approximately 9.

Thus, once a pH of about 9 (usually between 8.2 and 9.5) is determined, according to step (S104), and with pH readings approximately constant in time, it results that the waste water is satisfactorily pre-treated and mainly homogenized, so it can be sent (S105) via line (14) and pump (15) to the reservoir (20), in order to be blended with treated chlorinated drinking water (23) provided by the concessionaire of water supply. In said reservoir (20) occurs blending (S106) of the volume of pre-treated water coming from the tank (10, 11) with treated chlorinated drinking water, in a minimum ratio of 45%:55% in volume (pre-treated water:treated chlorinated drinking water). Thus, and in this step, the slightly alkaline content of the pre-treated water is reduced with an appropriate volume of treated chlorinated drinking water supplied by the concessionaire of water supply, according to steps S101 to S104, in order to result in a volume of water with neutral pH, or slightly acidic, and within the parameters that define drinking water for human consumption.

Thus, after blending (S107) the treated water according to the present method is ready to be used as drinking water, according to common uses.

Test Plant—Specifications

The data, indices, parameters and specific equipment reported in the description below are all linked to a test plant, particularly a pharmaceutical plant, used to validate preliminary laboratory tests, adjust operational parameters to an industrial scale, and mainly certify the procedures adopted according to agencies of control such as ANVISA (Agência Nacional de Vigância Sanitária—National Health Surveillance Agency), responsible for approval of all drugs and respective production processes, in Brazil, among others. The inventors also report that the test plant was recently approved by all governmental control and certification agencies.

Below are the processing steps for reusing waste water from reverse osmosis.

(1) Step of Pre-Treatment and Chlorination of Reverse Osmosis Waste Water

The reverse osmosis waste water from the PW generation equipment installed in the industry where the system was implemented has a waste water flow of up to 45% of the flow that feeds the equipment. Such water has a high concentration of saline ions, resulting in a basic and normally high pH value (a pH value up to 13) and a high electrical conductivity.

This waste water is directed to a storage system comprising two 10,000 litres reservoirs, two pumps for recirculation and flow of water, interconnecting pipes for all these components with automatically activated shut-off valves via control software, an automatic water chlorination unit having controlled and proportional addition of sodium hypochlorite solution (using a control routine), and sensor instruments installed in the pipes and tanks to determine on-line readings of temperature, pH, electrical conductivity, pressure and chlorination index of water. The system has two conductivity meters installed, the first one at the "waste water inlet in the system", which provides values for disposal of water that will not be reused, and the second one in the common water recirculation line to determine the final conductivity value of the chlorinated waste water.

Through reading of a conductivity meter and use of automatic valves installed in the pipeline, the osmosis waste water having an electrical conductivity above of a certain parameter (500 micro-Siemens, start and end of the osmosis cycle in the equipment) is promptly discarded directly to the drain and sewer line of the plant, such water not being usable for the process of the invention.

With data obtained in real time from the instruments sensors, the developed control routine determines the required recirculation time and the exact quantity of chlorine addition to the waste water, so that such water has actual "chlorination values" contained within the standards determined by law. The electrical conductivity values of the chlorinated waste water to be reused are available in real time and must always be within established standards.

In the reservoirs, the pH value of waste water (initially having pH values up to 13.0) decreases to about 9.0, because the addition and recirculation of Sodium Hypochlorite Solution (NaClO) in the reservoirs cause spontaneous chemical reactions, with formation of gas molecules of oxygen ($O_2$), hydrogen ($H_2$) and hydrogen sulfide ($H_2S$), among others, that simply migrate into the atmosphere since the tanks are opened and have atmospheric vents; the overall result of all these chemical reactions is the reduction of water pH values up to 9.0 and the availability of chlorine ions in solution (chlorinated water), which allows such water from the reservoirs to be blended with treated water from the concessionaire of water supply in the next step.

From then on, the waste water is ready to be added and blended in the main chlorinated drinking water reservoir of the plant.

There are two 10,000 litres reservoirs, thus while one reservoir is receiving waste water, the other is in process of chlorination and water transfer in the next step (2), and vice versa.

(2) Step of Blending of Chlorinated Waste Water

Such water has a slightly higher chlorination rate and electrical conductivity, both within legal standards.

The waste water is directed to the main storage reservoir of the plant, which has a capacity of 620,000 litres and is divided in two spaces (compartments) by the sending pump of the pre-treatment station.

The piping to the reservoir comprises automatic activation shut-off valves via control routine, and a totalizing flow meter also controlled by control routine.

Automatic activation shut-off valves and a totalizing flow meter (controlled via control routine) were installed in the treated chlorinated drinking water piping of SABESP (SAneamento Básico do Estado de São Paulo—Concessionaire responsible for water supply and sewage collection in São Paulo State) which feeds the main reservoir of the plant.

The main reservoir of the industrial plant is bipartite and has two compartments. A 372,000 litres upper compartment is used for blending chlorinated waste water (within a proportion between 40% to 45%) with treated chlorinated drinking water from SABESP, with such blending being then transferred by gravity to a 248,000 litres lower compartment, which feeds the plant with treated chlorinated drinking water. These two reservoirs are interconnected during the operation of the plant.

The transfer of chlorinated waste water to the upper reservoir is triggered by control routine, and the quantity of chlorinated waste water to be blended in the system is exactly quantified by the transfer pipe flow meter.

Once the quantity of chlorinated waste water is obtained and recorded via control routine, the routine calculates the quantity of SABESP treated chlorinated drinking water to be added, so that the resulting blended water continues within its standards of electrical conductivity, pH and chlorination.

Next, an automatic transfer of the quantity of SABESP water necessary for a correct blending is carried out through an automatic control routine.

After the transfer of SABESP treated chlorinated drinking water to the upper part of the reservoir, a recirculation is carried out to unify the contained water therein, and the conductivity of this blended water is obtained in real time through the conductivity meter sensor installed in the recirculation line.

Once such electrical conductivity value obtained is "approved" by the automatic control routine (within the legal standards), the routine releases transfer of this water to the lower reservoir, from which it will be used for consumption in any sector of the plant where necessary.

The system is able to reuse all the water generated in the reverse osmosis waste, provided that the water electrical conductivity is below the disposal value described in step (1) above.

Therefore, the process is completed and the reuse cycle of waste water in chained batches of 10,000 litres each is closed, such process being a semi-continuous chained process.

Due to the blending of quantities of chlorinated waste water having conductivity normally higher than the conductivity of water from the concessionaire of water supply, the average electrical conductivity of water in the plant reservoir will present a slight increase which, over the months of operation, will reach the higher value determined by the legal standards. The elapsed time cannot be precisely determined, as it depends on many variables, such as parameters and quality of water supplied by concessionaire SABESP and the volume of use of chlorinated drinking water from the plant.

When this electrical conductivity value is reached, the operation of the plant will discard all the water in the reservoir, without renewal, and proceed to fill the reservoir entirely with treated chlorinated drinking water, making it possible to start again the process of tenuous increase in electrical conductivity from "zero", and so on.

The invention claimed is:

1. A method of treatment of waste water originating from reverse osmosis (RO) filtration treatment comprising the steps of:
    receiving waste water from RO in a pre-treatment tank, wherein the waste water is discarded when a pH of the waste water is greater than 13;
    adding a hypochlorite compound to the waste water in the pre-treatment tank;
    homogenizing the waste water in the pre-treatment tank; and
    measuring the pH of the waste water in the pre-treatment tank, wherein:
        when the measured pH of the waste water is not within a pre-established pH limit, returning the waste water to the step of addition of a hypochlorite compound; and
        when the measured pH of said waste water is within the pre-established pH limit, sending the waste water to a blending reservoir and mix a quantity of up to 45% in volume of the waste water with a quantity of at least 55% in volume of a treated chlorinated drinking water, and
        wherein the pre-established pH limit is 8.2 to 9.5.

2. The method according to claim 1, wherein the step of adding a hypochlorite compound comprises adding a hypochlorite salt.

3. The method according to claim 1, wherein the step of adding a hypochlorite compound comprises adding sodium hypochlorite.

4. The method according to claim 1, wherein the step of homogenizing the waste water comprises recirculating the waste water in the pre-treatment tank.

5. The method according to claim 1, wherein the step of homogenizing the waste water comprises stirring the waste water in the pre-treatment tank.

6. The method according to claim 1, wherein the measuring step comprises employing a pH sensor to directly measure the pH.

7. The method according to claim 1, wherein the measuring step comprises employing an electrical conductivity sensor to measure a quantity of electrical conductivity proportional to the pH of the waste water.

8. The method according to claim 7, wherein in the measuring the pH of the waste water step, the pre-established pH limit corresponds to an electrical conductivity of 500 micro-Siemens.

9. The method according to claim 7, wherein the measuring step comprises employing a temperature sensor to thermally adjust the electrical conductivity of the waste water.

10. The method according to claim 1, wherein the measuring step comprises employing a temperature sensor to thermally adjust the pH value of the waste water.

11. The method according to claim 1, wherein in the measuring the pH of the waste water step, the pre-established pH limit is 9.

* * * * *